US012701650B2

(12) United States Patent
Larson

(10) Patent No.: US 12,701,650 B2
(45) Date of Patent: Aug. 4, 2026

(54) LOW ENERGY ELECTRON-COOLING SYSTEM AND METHOD

(71) Applicant: Particle Beam Lasers, Inc., Waxahachie, TX (US)

(72) Inventor: Delbert Larson, Waxahachie, TX (US)

(73) Assignee: Particle Beam Lasers, Inc., Waxahachie, TX (US)

( * ) Notice: Subject to any disclaimer, the term of this patent is extended or adjusted under 35 U.S.C. 154(b) by 68 days.

(21) Appl. No.: 18/889,916

(22) Filed: Sep. 19, 2024

(65) Prior Publication Data

US 2026/0089831 A1 Mar. 26, 2026

(51) Int. Cl.
*H05H 15/00* (2006.01)

(52) U.S. Cl.
CPC ......... *H05H 15/00* (2013.01); *H05H 2242/10* (2013.01)

(58) Field of Classification Search
None
See application file for complete search history.

(56) References Cited

U.S. PATENT DOCUMENTS

| | | | | |
|---|---|---|---|---|
| 3,719,893 | A * | 3/1973 | dePackh | H05H 1/54 376/127 |
| 4,867,939 | A | 9/1989 | Deutch | |
| 5,001,438 | A | 3/1991 | Miyata et al. | |
| 5,138,271 | A | 8/1992 | Ikegami | |
| 5,854,531 | A | 12/1998 | Young et al. | |
| 7,501,640 | B2 | 3/2009 | Larson | |
| 8,063,390 | B2 * | 11/2011 | Larson | H01J 37/08 315/505 |

OTHER PUBLICATIONS

D.J. Larson, "ECOFusion: An electron-cooled, colliding-beam, cellular approach to harnessing fusion power", Physics Essays, vol. 29: pp. 450-456, 2016.
G.I. Budker, et al., Particle Accelerators, vol. 7, 197-211 (1976).
H. Danared, et al., "Studies of electron cooling with a highly expanded electron beam", NIM, A441, 123-133 (2000).
L. Spitzer, "Physics of Fully Ionized Gases", (New York: Interscience, 1956) pp. 80-81.
M. Bell, et al., Physics Letters, vol. 87B, No. 3, (1979).

* cited by examiner

*Primary Examiner* — Kenneth B Wells
(74) *Attorney, Agent, or Firm* — Scale LLP

(57) ABSTRACT

An adiabatically expanded low energy electron-cooling system and method for increasing the phase space intensity and overall intensity of low energy particle beams, including a vacuum-chamber to allow electron beam and particle beam merging and separation, a cathode to generate the electron beam, a collector to collect the electron beam, magnetic field generation devices including solenoids and toroids to guide the electrons on their desired trajectories, ports to allow particles to enter and leave, neutralizing-background-ions to neutralize electron electric fields, electrodes to accelerate and decelerate the electron beam and an adiabatic-solenoid to enable electron beam expansion. By overlapping the electron and particle beams in an overlap-region, thermal energy is transferred from the particle beam to the electron beam, which allows an increase in the phase space density and overall density of the particle beams.

12 Claims, 3 Drawing Sheets

LOW ENERGY ELECTRON-COOLING SYSTEM AND METHOD

FIELD OF THE DISCLOSURE

The present invention relates to particle beam physics devices, and more particularly, to a method and system of increasing the phase space intensity and overall intensity of very low energy particle beams by overlapping a properly formed electron beam on the particle beam.

BACKGROUND

Electron-cooling is a central technology to the invention described herein. Warm ions come to equilibrium with cooler electrons in a plasma. Due to the much larger mass of the ion, the final root mean square (rms) speed of the ions is much less than that of the electrons. An electron beam is simply a moving electron plasma. By superimposing an ion beam on a co-moving electron beam, warmer ions are cooled by the electron beam. Electron-cooling is an effective way of increasing the phase space density and stored lifetime of proton beams.

Uses of high intensity, low energy ion beams may include the generation of photons, neutrons and a variety of nuclear isotopes, with improved efficiency and yield. Neutrons, isotopes, or photons are used in numerous applications. Neutron applications include boron neutron capture therapy, neutron radiography, and particularly, neutron irradiation for explosive detection, contraband detection, corrosion detection, and other types of non-destructive analysis. Isotope applications include positron emission tomography (PET). Photon (or gamma ray) applications include photonuclear interrogation which has been proposed as another means of detecting contraband and explosives. Photonuclear interrogation is also used for medical imaging and other nondestructive analysis of a wide range of materials.

Uses of high intensity, low energy ion beams may also include the production of energy through fusion interactions. Several nuclear reactions are known to produce much more energy than the energy required to initiate the interaction, and the initiation energy is very low by particle beam standards.

Uses of high intensity, low energy muon beams may include a source for a muon collider, enabling advances in high energy physics research.

Conventional techniques in electron-cooling use an electron beam and superimpose that electron beam onto the ion beam. Particle collisions between the two beams result in ion beam imperfections being transferred to the electron beam. The electron beam is then separated from the ion beam, and the electron beam is then collected in a collection device called a collector. Conventional techniques involve a direct acceleration of the electron beam from its source at a cathode, using electrodes biased positively with respect to the cathode and arranged so as to accelerate the electrons so that they have the same velocity as the ions. Typically, solenoidal and toroidal magnetic fields are used to guide the electron beam onto the ion beam, and then into the collector. Also typically, a corrective dipole magnetic field may be superimposed upon the toroidal magnetic fields in a toroid magnet. Conventional techniques involve trapping of neutralizing-background-ions to obtain higher electron beam currents. Conventional techniques also involve using an adiabatic-solenoid to expand the electron beam, resulting in higher density ion beams.

However, the conventional techniques have serious difficulty in obtaining the ion beam phase space intensity needed for applications such as colliding beam fusion and a muon source for a muon collider.

Accordingly, there is a need for an improved method and system for generating electron beams that will overcome the intensity limit of conventional techniques.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

The present invention relates to a method and system for generating high current electron beams that overcome the beam-current limit presented by the beam's self space charge while also reducing the transverse velocity within those electron beams. The electron-cooling system includes a vacuum-chamber, an electron cathode source, electrodes to accelerate the electrons away from the cathode, a downstream electrode to decelerate the electrons to the desired low velocity, solenoids and toroids to guide the beam onto and off of a co-moving particle beam, ports to allow the particles to enter and leave the system, an overlap-region wherein the electron beam and particle beam overlap, neutralizing-background-ions to neutralize the electron beam self space charge, downstream electrodes including an electron beam collector to collect the electrons after the cooling is completed, and an adiabatic-solenoid to adiabatically expand the electron beam in order to reduce the transverse velocity within the electron beam.

The present invention employs a cathode-side electrode biased positively with respect to the final cathode-side electrode and also employs a collector-side electrode biased positively with respect to the initial collector-side electrode as well as an adiabatic-solenoid to adiabatically expand the beam. Additional electrodes may be used on the cathode-side and collector-side as well. The final cathode-side electrode and initial collector-side electrode are each biased at the potential of the overlap-region of the vacuum-chamber within which the electron beam and particle beam overlap. The presence of electrodes biased in this way enables an electric field which results in a force on the electrons that is directed away from the region where the beams overlap. Since the force on positively charged ions is in the opposite direction as the force on negatively charged electrons, the positively charged (non-beam) neutralizing-background-ions will be trapped longitudinally within the overlap-region. The neutralizing-background-ions will also be trapped transversely by the solenoidal and toroidal magnetic guide fields. Hence, the neutralizing-background-ions are effectively trapped within the region that the electron and particle beams overlap. Since the trapped neutralizing-background-ions have positive charge, while the electrons have negative charge, the presence of the trapped neutralizing-background-ions will substantially offset the electron beam self space charge, enabling substantially larger currents in the electron beam. The adiabatically expanded beam also has lower electron beam transverse velocities.

The electron-cooling system includes an electron injector which injects an electron beam onto the path of a particle beam, and an electron collector which captures the electron beam. The electrons are injected with a predetermined amount of energy to cause the particles in the particle beam to move at an ideal velocity. By traveling and interacting with the particle beam, the electron beam increases the phase space density of the particle beam. Any heating, scattering and even deceleration that would otherwise adversely affect the particles in the particle beam may be effectively compensated for by the electron beam. Accordingly, scattering and energy loss in the particle beam may be substantially continuously compensated for before significant instabilities have an opportunity to develop. In this manner, events that would typically cause significant instabilities in the particle beam may be minimized if not eliminated.

Since the effectiveness of the correction of particle beam errors is proportional to the electron current in the overlapping electron beam and also improved by lower electron transverse velocity, the present invention may result in a large improvement in the achievable intensity and beam quality of low energy particle beams. By enabling higher intensity and beam quality of low energy particle beams, the present invention may also lead to improvement in the yields of photons, neutrons, nuclear isotopes and fusion energy produced by the low energy particle beams as well as enable a high-density muon source for a muon collider.

Other features and advantages of the present invention will become apparent from the following detailed description of the disclosed embodiments, taken in conjunction with the accompanying drawings, which illustrate by way of example the principles of the invention.

BRIEF DESCRIPTION OF THE DRAWINGS

The accompanying drawings, which are incorporated in and constitute a part of this specification, show certain aspects of the subject matter disclosed herein and, together with the descriptions, help explain some of the principles associated with the disclosed implementations.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

A First Embodiment—Case One

Figure 1:
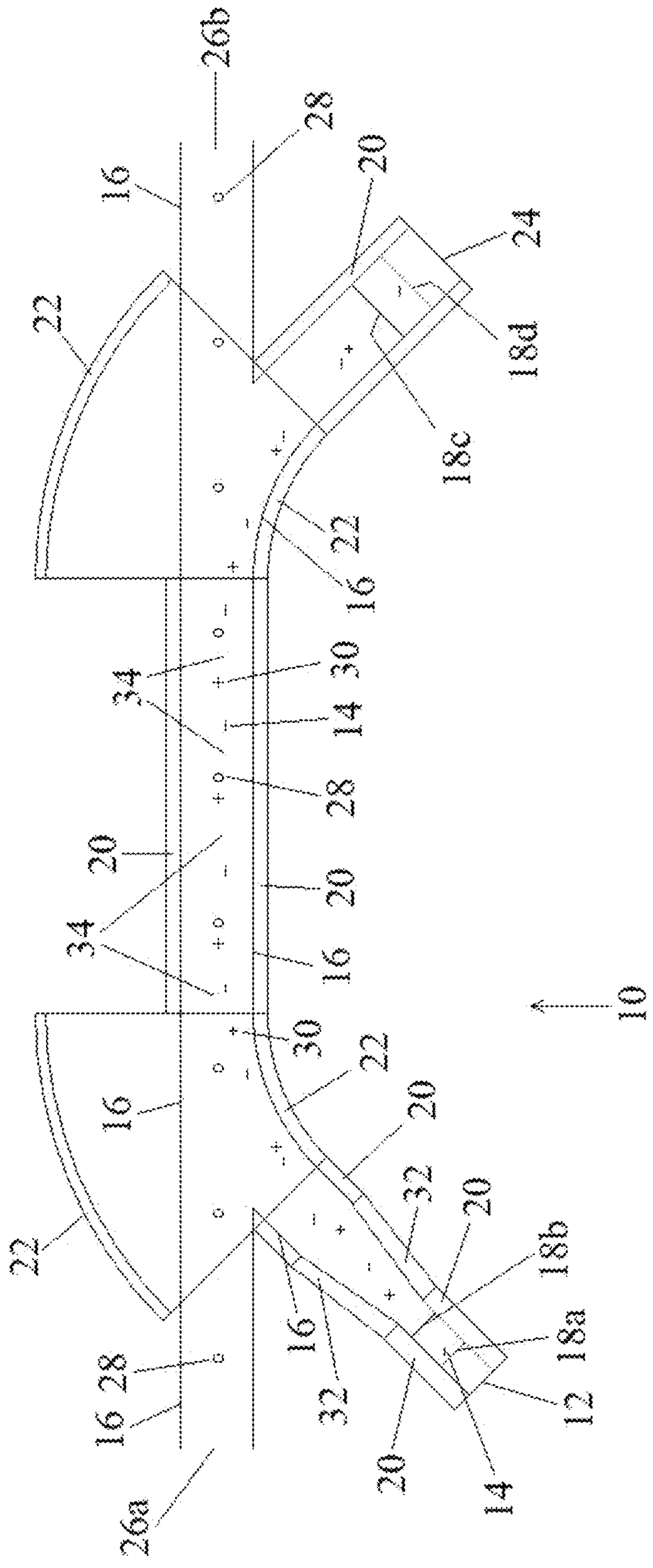
FIG. 1 is a schematic view of a first embodiment of a system for use of the invention relevant to colliding beam fusion.

An electron-cooling system 10 for increasing the phase space intensity and overall intensity of low energy particle 28 beams is shown in FIG. 1 for a first embodiment. The electron-cooling system 10 utilizes a combination of elements, including the electron 14 supply device such as an electron cathode 12 for supplying a beam of electrons 14, a vacuum-chamber 16 for containing particles 28, electrodes 18*a* through 18*d* to provide electric fields to accelerate or decelerate the electron 14 beam and which serve to trap neutralizing-background-ions 30, solenoids 20 and toroids 22 to provide guiding and containing magnetic fields, an electron collector 24 having a material surface to collect the electrons 14 after they have performed their function, ports 26*a* and 26*b* to allow beam particles 28 to enter and leave the electron-cooling system 10 and an adiabatic-solenoid 32 to expand the electron 14 beam. Positive neutralizing-background-ions 30, trapped by the fields of the electrodes 18, solenoids 20, and toroids 22 are also shown in FIG. 1. Note that toroids 22 will generate a predominantly toroidal magnetic field that may also contain a corrective dipole magnetic field.

The electron cathode 12 can be made of, for example, off the shelf materials standard for contemporary electron 14 sources. The cathode 12 is essentially a hot surface from which electrons 14 are freed. By placing an electrode 18*a* in front of the cathode 12, an electric field is generated. The magnitude of the electric field is given by the expression:

$$E = V/x \tag{1}$$

In equation (1), V is the potential difference between the cathode 12 and the electrode 18*a* and $x$ is the distance between the cathode 12 and the electrode 18*a*.

The amount of electron 14 beam current that is generated by an electron system comprised of an electron cathode 12 and a first electrode 18*a* is determined by Child's Law $$J = (4\varepsilon_0/9d^2)(2e/m_e)^{1/2} V^{3/2} \tag{2}$$

In equation (2), J is the space charge limited current density, V is the potential difference between the cathode 12 and the first electrode 18*a*, $\varepsilon_0 = 8.854\times10^{-12}$ $C^2s^2/(m^3\ kg)$ is the permittivity of free space, d is the separation distance between the cathode 12 and the first electrode 18*a*, $e = 1.602\times10^{-19}$ C is the charge on the electron 14 and $m_e = 9.11\times10^{-31}$ kg is the mass of the electron 14. For a circular cathode 12 area of radius r, $I = J\pi r^2$, and hence $$I = (4\pi r^2\varepsilon_0/9d^2)(2e/m_e)^{1/2} V^{3/2} \tag{3}$$

The first embodiment of the invention includes the cooling of particle 28 beams stored in a colliding beam dual storage ring system. Such a dual storage ring system can produce energy by way of fusion reactions and be used as a fusion energy power source. The time required to cool particle 28 beams overlapped by an electron 14 beam is given by the following expression:

$$\tau_{cool} = 1/K_{in} = v_{emax}^3 Ca^2 e\beta_{beam}/4IL_{cool}c^3 r_e r_i \ln(B) \tag{4}$$

The particle 28 beams used in fusion reactions may have an energy of between 20.0 keV and 5.0 MeV and the particles 28 used may be deuterium, tritium, and He-3. As one example, the deuterium particle 28 energy can be chosen as 247.2 keV and the tritium particle 28 energy chosen as 167.5 keV. For electron-cooling to function, the average velocity of the electron 14 beam should be equal to the average velocity of the particle 28 beam, and for the case of a 247.2 keV deuterium particle 28 beam this means that the electron 14 beam has an energy of 67.3 eV. For the case of a 167.5 keV tritium particle 28 beam this means that the electron 14 beam has an energy of 30.5 eV.

Figure 2:
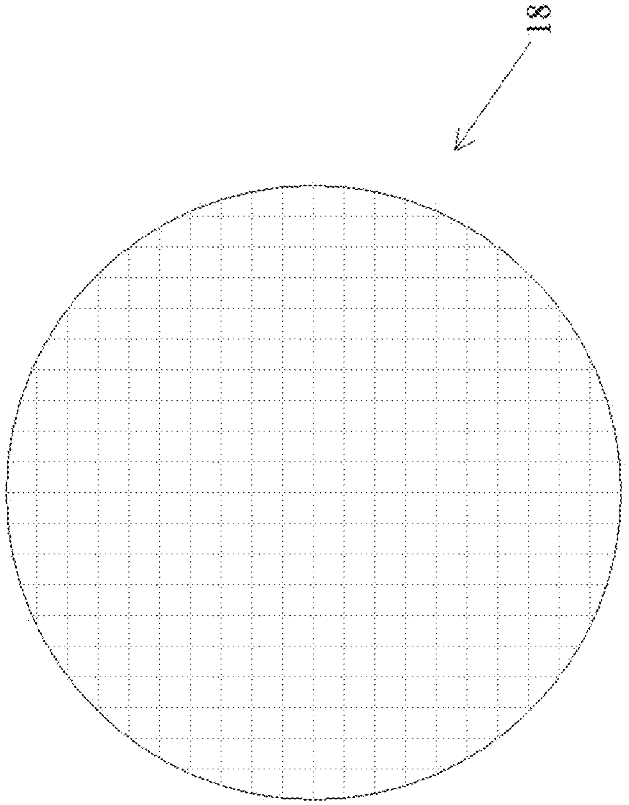
FIG. 2 is a schematic view of an electrode involving a grid structure.

A first embodiment could involve, for example, a cathode 12 with a 12.7 cm radius and a first electrode 18*a* positioned 5.0 mm downstream from the cathode 12. For the first embodiment a grid electrode structure shown in FIG. 2 may be employed for the first electrode 18*a*. By using a 16.5 kV potential difference between the first electrode 18*a* and the cathode 12 an electron 14 beam current of approximately 10,000 A results. The cathode 12 will produce about 20 $A/cm^2$ in this example. It is noteworthy that higher current densities may be beneficial should such technology become available. After passing through the first electrode 18*a* the electron 14 beam will be decelerated by the electric field generated by electrodes 18*a* and 18*b* and then pass through the electrode 18*b* which is biased at a 30.5 V potential with respect to the cathode 12. Electrodes 18*a* and 18*b* will be within a solenoid 20. The electron 14 beam then enters the adiabatic-solenoid 32 where it is expanded by a gradually decreasing solenoidal field to a beam radius of 30 cm. The electron 14 beam then is merged with a particle 28 beam by the magnetic field of a first toroid 22 and after drifting along with the particle 28 beam in an overlap-region 34 the electron 14 beam is separated from the particle 28 beam by the magnetic field of a second toroid 22. After leaving the second toroid 22 the electron 14 beam passes through electrodes 18*c* and 18*d* and is collected in a collector 24. The particle 28 beam (which may be, for example, tritium ions in this embodiment) enters through a port 26*a* and leaves through a port 26*b*. Electrons 14, particles 28 (which may be, for example, tritium ions in this embodiment and case) and neutralizing-background-ions 30 all reside within a vacuum-chamber 16 in this embodiment.

Consider first the case of a cooler for the tritium particles 28 with an electron 14 beam energy of 30.5 eV. One issue concerning the cooling time given in Eq. (4) is that it is inversely proportional to the electron 14 beam current, I.

Without some apparatus to neutralize the charge of electron 14 beams, the potential difference between the beam center and the beam edge is given by the following expression:

$$V = 30I/\beta \tag{5}$$

In the above expression, I is the current of the electron 14 beam in amps and β is the average velocity of the electron 14 beam divided by the speed of light. For the case considered here I is 10,000 A and β is 0.0109, leading to a beam center to beam edge potential difference of over 27 million volts. Clearly such a large current cannot be sustained, since the beam energy has been specified to be only 30.5 eV. Indeed, were the current to be limited by its own self space charge, the limit would be I=0.0109 A, which is about one million times less than the desired value of 10,000 A. Even more constraining is the condition of the energy spread within the beam. For electron-cooling to work, the electron 14 energies should all be in a range of values, typically within 1% or less of the central electron 14 beam energy. A space charge potential of 0.3 V, leading to an electron 14 beam energy spread of 1% of the 30.5 eV main electron 14 beam energy, would limit the useful electron-cooling current to 0.1 milliamps, 100 million times less than the desired current.

The present invention uses a second electrode 18*b* prior to electron 14 beam entry into the toroid 22 that is at the desired potential difference from the cathode 12, while also employing the first electrode 18*a* prior to the second electrode 18*b*, where the first electrode 18*a* is at a more positive potential than the second electrode 18*b*, resulting in an electric field that decelerates the electrons 14 before they enter the toroid 22. This same electric field will cause any positive neutralizing-background-ions 30 present in the system to be reflected back into the cooling region.

The positive neutralizing-background-ions 30 will be formed as a result of collisions between the electrons 14 and neutral gas molecules present inside of the vacuum-chamber 16 as the electron 14 beam traverses the system. The positive neutralizing-background-ions 30 will be formed with an energy of about $1/40^{th}$ of an eV, which is the energy of typical room temperature gases and the positive neutralizing-background-ions 30 will therefore be trapped radially by the toroidal and solenoidal fields. The positive neutralizing-background-ions 30 will execute an approximate helical motion around the magnetic field lines with the radius of the helix given by the following expression:

$$r = mv/eB \tag{6}$$

In equation (6) m is the mass of the positive neutralizing-background-ion 30, e is the charge on the positive neutralizing-background-ion 30, B is the magnetic field of the solenoid 20 or toroid 22, and v the velocity of the positive neutralizing-background-ion 30 perpendicular to the magnetic field. For the case of a carbon atom with an energy of $1/40^{th}$ of an eV, equation (6) may result in an expected radius of the helical motion of about 2 mm.

On the collector-side, the present invention uses a third electrode 18*c* after electron 14 beam exit from the toroid 22 that is at the desired potential difference from the cathode 12, while also employing a fourth electrode 18*d* downstream from the third electrode 18*c*, where the third electrode 18*c* is at a less positive potential than the fourth electrode 18*d*, resulting in an electric field that accelerates the electrons 14 after they leave the third electrode 18*c*. This same electric field will cause any positive neutralizing-background-ions 30 present in the system to be reflected back into the overlap-region 34. The overlap-region 34 is the region where the particle 28 beam and electron beam 14 are overlapped.

Therefore, the positive neutralizing-background-ions 30 will be trapped radially by the solenoidal and toroidal fields produced by the solenoids 20 and toroids 22, and the positive neutralizing-background-ions 30 will be trapped longitudinally by the electric fields produced by the electrodes 18*a*, 18*b*, 18*c* and 18*d*. The combination of longitudinal and radial trapping means that the positive neutralizing-background-ions 30 are fully trapped within the overlap-region 34. The buildup of the positive neutralizing-background-ions 30 will continue until the electron 14 beam is essentially neutralized, allowing for large electron 14 currents.

Since Eq. (4) stipulates that $\tau_{cool}$ is inversely proportional to the electron 14 beam current, this effect strongly increases the cooling.

The present invention will adiabatically decrease the transverse electron 14 velocity $v_{emax}$ by using an adiabatic-solenoid 32. The adiabatic expansion of the electron 14 beam will experience a reduction ratio in transverse velocity spread equal to the expansion ratio of the beam radius provided that the adiabatic condition holds. The adiabatic condition is that the relative change in the magnetic field dB/B is small during a single cyclotron period, where the cyclotron frequency is defined as:

$$f_C = eB/2\pi m_e \quad (7)$$

For the first embodiment, a magnetic field may be 0.1 T at the beginning of the adiabatic-solenoid 32 and the electron 14 beam may expand from a radius of 12.7 cm at the cathode 12 to 30 cm at the end of the adiabatic-solenoid 32 for an expansion ratio of 2.362. With these values, the magnetic field drops from 0.1 T at the beginning of the adiabatic-solenoid 32 to 0.1 T/2.362=0.0423 T by the end of the adiabatic-solenoid 32, and hence the total change in field is ΔB=0.0577 T over the length of the adiabatic-solenoid 32. To evaluate the adiabatic condition of a small dB/B, consider an adiabatic-solenoid 32 with a length of 10 cm and a linear decrease of B, and hence dB/dx=ΔB/L=0.577 T/m over the length of the adiabatic-solenoid 32. It is at the end of the adiabatic-solenoid 32 that both dB/B and $T_C=1/f_C$ are the largest, since B is smallest there. At the end of the adiabatic-solenoid 32, the cyclotron frequency is $1.185\times10^9$ Hz, corresponding to a period of cyclotron motion of $T_C=1/f_C=8.439\times10^{-10}$ s. For case one of the first embodiment, the electron 14 beam average velocity will be $v_D=0.0109c=3.268\times10^6$ m/s. Here c is the speed of light. Hence, the electron 14 will move $dx=v_D T_C=2.76$ mm during one cyclotron period at the end of the adiabatic-solenoid 32 and $dB=(dB/dx)\times dx=0.577$ T/m$\times2.76\times10^{-3}$ m$=1.59\times10^{-3}$ T, and hence $dB/B=1.59\times10^{-3}$ T/0.0423 T$=3.76\times10^{-2}$ so dB/B is small throughout the adiabatic-solenoid 32 in this case. Therefore, lengths of the adiabatic-solenoid 32 equal to or greater than 10 cm may be acceptable for a starting field of 0.1 T in this first embodiment.

Since Eq. (4) stipulates that $\tau_{cool}$ is proportional to $v_{emax}^3$, use of the adiabatic-solenoid 32 to expand the beam, and thereby reducing $v_{emax}$, will increase the cooling effectiveness. $v_{emax}$ is the transverse velocity spread of the electron 14 beam.

The first embodiment of the present invention combines trapping of neutralizing-background-ions 30 with an adiabatic increase of the electron 14 beam size (which decreases the transverse velocity spread $v_{emax}$ within the electron 14 beam) in order to maximize the cooling effectiveness within a single system and method. This combination may allow for a significant increase in the cooling.

A First Embodiment—Case Two

For case two of the first embodiment, one difference from case one of the first embodiment is the potential difference between the cathode 12 and the electrodes 18*b* and 18*c* that are nearest to the toroids 22. In the first embodiment, case two, this potential difference may be 67.3 V rather than the 30.5 V specified in the first embodiment, case one. The analysis changes only in a straightforward way that those skilled in the art can determine based on the present invention's description of the first embodiment, case one.

A First Embodiment—General Case

For the general case of the first embodiment, the potential difference between the cathode 12 and the electrodes 18*b* and 18*c* that are nearest to the toroids 22 can be anywhere in a range between 2 V and 1.5 kV. This range comes from the range over which fusion cross sections are highest. The lowest energy of the desired fusion energy range is 20 keV, which is about 10 times less than the energy considered in the First Embodiment, Cases One and Two. Hence, the lowest energy electron 14 beam will be 10 times less than the 30.5 eV used therein, or 3 eV. Since the charge on the electron 14 is e, the potential difference between the cathode 12 and the electrodes 18*b* and 18*c* is 3 V in this case. The highest energy of the desired fusion energy range is 5.0 MeV, which is about 20 times larger than the energy considered in the First Embodiment, Cases One and Two. Hence, the largest energy electron 14 beam will be 20 times more than the 67.3 eV used therein, or 1.34 keV. Since the charge on the electron 14 is e, the potential difference between the cathode 12 and the electrodes 18*b* and 18*c* is 1.34 kV in this case.

A Second Embodiment

A second embodiment of the invention includes the cooling of particle 28 beams for a muon collider. Recall Eq. (4) for the time required to cool particle 28 beams overlapped by an electron 14 beam:

$$\tau_{cool} = 1/K_{in} = v_{emax}^3 C a^2 e \beta_{beam} / 4 I L_{cool} c^3 r_e r_i \ln(B) \quad (4)$$

The particle 28 beams envisioned for use in a muon collider will be muons with an energy of between several keV to several TeV depending on the design of that collider. The invention may be useful for the lower range of muon energies (from 1 keV to 1 MeV). As seen in Eq. (4) the cooling time is lower for smaller $\beta_{beam}$ and for that reason the second embodiment is chosen with $\beta_{beam}=v_{beam}/c=0.02$ and a corresponding electron 14 beam energy of 102.2 eV.

Figure 3:
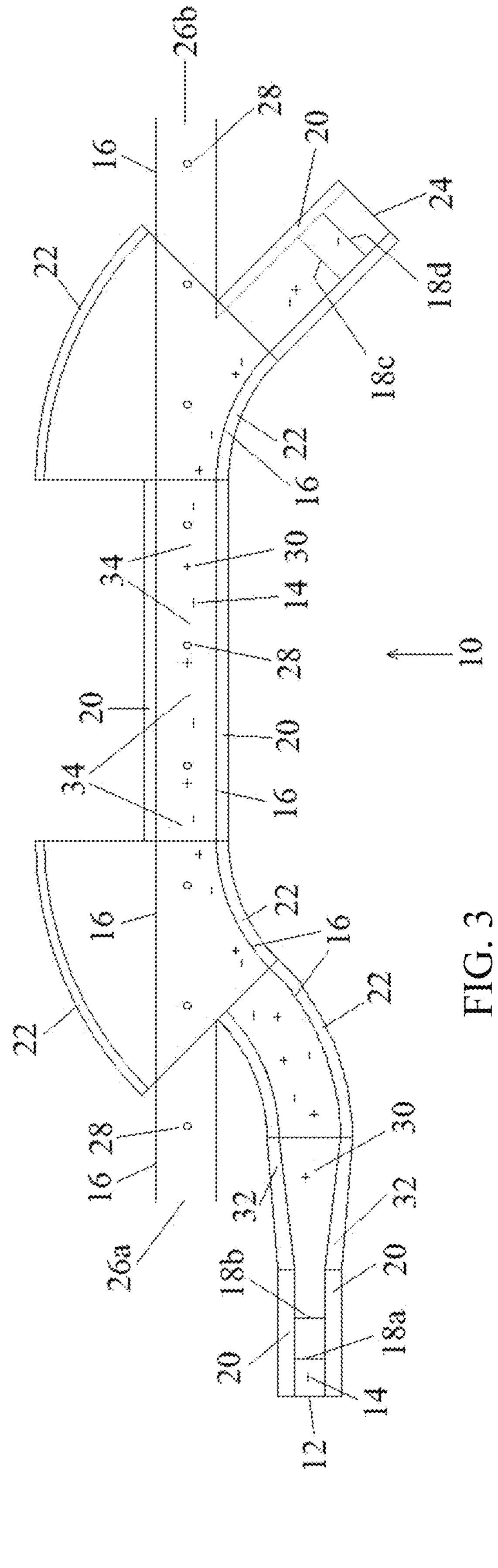
FIG. 3 is a schematic view of a second embodiment of a system for use of the invention relevant to a muon collider.

The second embodiment is shown in FIG. 3 and it could involve a cathode 12 with a 4.8 cm radius and a first electrode 18*a* positioned 5.0 mm downstream from the cathode 12. For the second embodiment, a grid electrode structure shown in FIG. 2 may be employed for the first electrode 18*a*. By using a 16.6 kV potential difference between the first electrode 18*a* and the cathode 12, an electron 14 beam current of approximately 1,445 A results. The cathode 12 will produce about 20 A/cm$^2$ in this example. It is noteworthy that higher current densities may be beneficial should such technology become available. After passing through the first electrode 18*a*, the electron 14 beam will be decelerated by the electric field generated by electrodes 18*a* and 18*b* and then pass through the electrode 18*b* which is biased at a 102.2 V potential with respect to the cathode 12. Electrodes 18*a* and 18*b* will be within a solenoid 20. The electron 14 beam then enters the adiabatic-solenoid 32 where it is expanded by a gradually decreasing solenoidal field to a beam radius of about 33.6 cm. The electron 14 beam may pass through a solenoid 20 and then is merged with a particle 28 beam (the particles 28 may be muons in this embodiment) by the magnetic fields of a first toroid 22 and a second toroid 22 and after drifting along with the particle 28 beam in an overlap-region 34 the electron 14 beam is separated from the particle 28 beam by the magnetic field of a third toroid 22. The overlap-region 34 exists within a solenoid 20 and between the second toroid 22 and the third toroid 22. After leaving the third toroid 22, the electron 14 beam passes through electrodes 18*c* and 18*d* and is collected in a collector 24. The particle 28 beam (muons in this embodiment) enters through a port 26*a* and leaves through a port 26*b*. Electrons 14, particles 28 (muons in this embodiment) and neutralizing-background-ions 30 all reside within a vacuum-chamber 16 in this embodiment.

The cooling time given in Eq. (4) above is inversely proportional to the electron 14 beam current, I.

Without some apparatus to neutralize the charge of electron 14 beams, the potential difference between the beam center and the beam edge is given by Eq. (5):

$$V = 30I/\beta \tag{5}$$

In Eq. (5), I is the current of the electron 14 beam and p is the average velocity of the electron 14 beam divided by the speed of light. For the case considered here, I is 1,445 A and p is 0.02, leading to a beam center to beam edge potential difference of over 2.1 million volts. Clearly such a large current cannot be sustained, since the beam energy has been specified to be only 102.2 eV. Even more constraining is the condition of the energy spread within the beam. For electron-cooling to work, the electron 14 energies should all be in a range of values, typically within 1% or less of the central electron 14 beam energy.

The present invention uses a second electrode 18*b* prior to electron 14 beam entry into the first toroid 22 that is at the desired potential difference from the cathode 12, while also employing the first electrode 18*a* prior to the second electrode 18*b*, where the first electrode 18*a* is at a more positive potential than the second electrode 18*b*, resulting in an electric field that decelerates the electrons 14 before they enter the toroid 22. This same electric field will cause any positive neutralizing-background-ions 30 present in the system to be reflected back into the cooling region.

The positive neutralizing-background-ions 30 will be formed as a result of collisions between the electrons 14 and neutral gas molecules present inside of the vacuum-chamber 16 as the electron 14 beam traverses the system. The positive neutralizing-background-ions 30 will be formed with an energy of about $1/40^{th}$ of an eV, which is the energy of typical room temperature gases and the positive neutralizing-background-ions 30 will therefore be trapped radially by the toroidal and solenoidal fields.

On the collector-side, the present invention uses a third electrode 18*c* after electron 14 beam exit from the toroid 22 that is at the desired potential difference from the cathode 12, while also employing a fourth electrode 18*d* downstream from the third electrode 18*c*, where the third electrode 18*c* is at a less positive potential than the fourth electrode 18*d*, resulting in an electric field that accelerates the electrons 14 after they leave the third electrode 18*c*. This same electric field will cause any positive neutralizing-background-ions 30 present in the system to be reflected back into the overlap-region 34.

Therefore, the positive neutralizing-background-ions 30 will be trapped radially by the solenoidal and toroidal fields produced by the solenoids 20 and toroids 22, and the positive neutralizing-background-ions 30 will be trapped longitudinally by the electric fields produced by the electrodes 18*a*, 18*b*, 18*c* and 18*d*. The combination of longitudinal and radial trapping means that the positive neutralizing-background-ions 30 are fully trapped within the overlap-region 34. The buildup of the positive neutralizing-background-ions 30 will continue until the electron 14 beam is essentially neutralized, allowing for large electron 14 currents.

Since Eq. (4) stipulates that $\tau_{cool}$ is inversely proportional to the electron 14 beam current, this effect strongly decreases the cooling time, which may be beneficial for a muon collider, since muons live for only about two millionths of a second.

The present invention will adiabatically decrease the transverse electron 14 velocity $v_{emax}$ by using an adiabatic-solenoid 32. The adiabatic expansion of the electron 14 beam will experience a reduction ratio in transverse velocity spread equal to the expansion ratio of the beam radius provided that the adiabatic condition holds. The adiabatic condition is that the relative change in the magnetic field dB is small compared to the magnetic field B during a single cyclotron period, where the cyclotron frequency is defined above in Eq. (7):

$$f_C = eB/2\pi m_e \tag{7}$$

For the second embodiment, a magnetic field may be, for example, 1 T at the beginning of the adiabatic-solenoid 32 and the electron 14 beam may expand from a radius of 4.8 cm at the cathode 12 to 33.6 cm at the end of the adiabatic-solenoid 32 for an expansion ratio of 7. With these values, the magnetic field drops from 1 T at the beginning of the adiabatic-solenoid 32 to 1 T/7=0.143 T by the end of the adiabatic-solenoid 32, and hence the total change in field is $\Delta B$=0.857 T over the length of the adiabatic-solenoid 32. To evaluate the adiabatic condition of a small dB/B, consider an adiabatic-solenoid 32 with a length of 1 m and a linear decrease of B, and hence dB/dx=$\Delta$B/L=0.857 T/m over the length of the adiabatic-solenoid 32. It is at the end of the adiabatic-solenoid 32 that both dB/B and $T_C=1/f_C$ are the largest, since B is smallest there. At the end of the adiabatic-solenoid 32, the cyclotron frequency is $4.00\times10^9$ Hz, corresponding to a period of cyclotron motion of $T_C=1/f_C=2.50\times10^{-10}$ s. For the second embodiment, the electron 14 beam average velocity will be $v_{muon}=0.02c=6.00\times10^6$ m/s. Here c is the speed of light. Hence, the electron 14 will move $dx=v_{muon}T_C=1.5$ mm during one cyclotron period at the end of the adiabatic-solenoid 32 and $dB=(dB/dx)\times dx=(0.857\ T/m)\times1.5\times10^{-3}\ m=1.29\times10^{-3}$ T, and hence $dB/B=1.29\times10^{-3}\ T/0.143\ T=9.00\times10^{-3}$ so dB/B is small throughout the adiabatic-solenoid 32 in this case. Therefore, lengths of the adiabatic-solenoid 32 equal to or greater than 1 m may be acceptable for a starting field of 1 T in this second embodiment.

Since Eq. (4) stipulates that $\tau_{cool}$ is proportional to $v_{emax}^3$, use of the adiabatic-solenoid 32 to expand the beam, and thereby reducing $v_{emax}$, will increase the cooling effectiveness. $v_{emax}$ is the transverse velocity spread of the electron 14 beam.

The second embodiment of the present invention combines trapping of neutralizing-background-ions 30 with an adiabatic increase of the electron 14 beam size (which decreases the velocity spread $v_{emax}$ within the electron 14 beam) in order to maximize the cooling effectiveness within a single system and method. This combination may allow for a significant increase in the cooling.

Other Embodiments

The above sections have described certain illustrative embodiments of the invention. It should be noted here that other embodiments may include electrodes 18 that have different geometries for allowing beam passage, such as hexagonal or irregularly spaced grid wires or parallel wires only to replace the grid structure shown in FIG. 2.

Further, it is possible that the collector 24 itself could be used as the fourth electrode 18*d*, since the collector 24 could be biased positively with respect to the vacuum-chamber 16 surrounding the overlap-region 34 to provide the necessary fields to trap the neutralizing-background-ions 30. Employing a separate fourth electrode 18*d* along with additional collector-side electrodes 18 allows energy recovery from the electron 14 beam, and biasing the collector 24 even more positively than the vacuum-chamber 16 surrounding the overlap-region 34 may result in an even more energetic beam impinging upon the collector 24, but it would serve as one end of a longitudinal trap for the neutralizing-background-ions 30. Using electrodes 18 in the collector 24 to allow energy recovery from the electron 14 beam is one exemplary approach.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An electron beam and particle beam system, comprising:

an electron beam;

a particle beam;

neutralizing-background-ions;

a vacuum-chamber to allow passage, merging and separation of said electron beam and said particle beam including an overlap-region wherein said electron beam and said particle beam are overlapped and including a first port to allow entrance of said particle beam into said vacuum-chamber and including a second port to allow exit of said particle beam out of said vacuum-chamber;

an electron supply device including a cathode to produce said electron beam;

an electron collector to collect said electron beam; and a first electrode located downstream from said cathode and biased at a positive potential with respect to said cathode in order to accelerate said electron beam;

a second electrode located downstream from said first electrode and upstream from said overlap-region and biased at a less positive potential than said first electrode to provide a first end of a longitudinal electric potential trap for said neutralizing-background-ions;

a magnetic field production device to create magnetic fields to guide said electron beam along a desired path, merge and separate said electron beam and said particle beam, provide radial trapping for said neutralizing-background-ions, and including an adiabatic-solenoid located upstream from said overlap-region to adiabatically increase the size of said electron beam, thereby reducing the transverse velocity spread within said electron beam;

a third electrode located downstream from said overlap-region; and a fourth electrode located downstream from said third electrode and biased at a more positive potential than said third electrode to provide a second end of said longitudinal electric potential trap for said neutralizing-background-ions.

2. The system in accordance with claim 1, wherein said first electrode, said second electrode, said third electrode, and said fourth electrode each include a grid conducting structure to allow passage of said electron beam.

3. The system in accordance with claim 1, wherein said fourth electrode is said electron collector.

4. The system in accordance with claim 1, wherein said magnetic field production device includes solenoids and toroids containing wire windings with electric current flowing through the wire windings.

5. The system in accordance with claim 1, wherein said magnetic field production device includes permanent magnet material.

6. The system in accordance with claim 5, wherein said magnetic field production device includes solenoids and toroids containing wire windings with electric current flowing through the wire windings and permanent magnet material.

7. A method of cooling a low energy particle beam with an electron beam while containing neutralizing-background-ions, comprising the steps of:

operating a vacuum-chamber to allow passage, merging and separation of said electron beam and said particle beam including an overlap-region wherein said electron beam and said particle beam are overlapped and where a first port allows entrance of said particle beam into said vacuum-chamber and where a second port allows exit of said particle beam out of said vacuum-chamber;

operating an electron supply device including a cathode to produce said electron beam;

operating an electron collector to collect said electron beam;

operating a first electrode located downstream from said cathode and biased at a positive potential with respect to said cathode in order to accelerate said electron beam;

operating a second electrode located downstream from said first electrode and upstream from said overlap-region and biased at a less positive potential than said first electrode to provide a first end of a longitudinal electric potential trap for said neutralizing-background-ions;

operating a magnetic field production device to create magnetic fields to guide said electron beam along a desired path, merge and separate said electron beam and said particle beam, provide radial trapping for said neutralizing-background-ions and including an adiabatic-solenoid located upstream from said overlap-region to adiabatically increase the size of said electron beam, thereby reducing the transverse velocity spread within said electron beam;

operating a third electrode located downstream from said overlap-region; and operating a fourth electrode located downstream from said third electrode and biased at a more positive potential than said third electrode to provide a second end of said longitudinal electric potential trap for said neutralizing-background-ions.

8. The method in accordance with claim 7, wherein said first electrode, said second electrode, said third electrode, and said fourth electrode each include a grid conducting structure to allow passage of said electron beam.

9. The method in accordance with claim 7, wherein said fourth electrode is said electron collector.

10. The method in accordance with claim 7, wherein said magnetic field production device includes solenoids and toroids containing wire windings with electric current flowing through the wire windings.

11. The method in accordance with claim 7, wherein said magnetic field production device includes permanent magnet material.

12. The method in accordance with claim 11, wherein said magnetic field production device includes solenoids and toroids containing wire windings with electric current flowing through the wire windings and permanent magnet material.

* * * * *